United States Patent [19]

Nishikimi et al.

[11] Patent Number: 5,401,086
[45] Date of Patent: Mar. 28, 1995

[54] ANTILOCKING BRAKE FLUID PRESSURE CONTROL UNIT FOR VEHICLE BRAKE SYSTEM

[75] Inventors: Makoto Nishikimi; Yoshiyuki Oka, both of Hyogo, Japan

[73] Assignee: Sumitomo Electric Industries, Ltd., Osaka, Japan

[21] Appl. No.: 185,322

[22] Filed: Jan. 21, 1994

Related U.S. Application Data

[63] Continuation of Ser. No. 967,220, Oct. 27, 1992, abandoned.

[30] Foreign Application Priority Data

Nov. 19, 1991 [JP] Japan ................ 3-094776 U

[51] Int. Cl.$^6$ ........................... B60T 8/32
[52] U.S. Cl. ........................ 303/116.1; 303/10; 303/115.4; 303/DIG. 2; 303/87; 303/900; 303/901
[58] Field of Search .............. 303/116.1, 116.2, 119.2, 303/113.1, 87, DIG. 1, DIG. 2, 10, 115.4, 900, 901

[56] References Cited

U.S. PATENT DOCUMENTS

| | | | |
|---|---|---|---|
| 3,819,236 | 6/1974 | Fink et al. | 303/116.1 |
| 4,640,558 | 2/1987 | Nomura et al. | 303/116.1 |
| 4,938,545 | 7/1990 | Shuey et al. | 303/119.2 |
| 4,952,002 | 8/1990 | Arikawa et al. | 303/116.1 |
| 5,013,096 | 5/1991 | Ocvirk et al. | 303/116.1 |
| 5,033,800 | 7/1991 | Willmann | 303/116.1 |

FOREIGN PATENT DOCUMENTS

| | | |
|---|---|---|
| 0303261 | 2/1989 | European Pat. Off. . |
| 0361502 | 4/1990 | European Pat. Off. . |
| 0401856 | 12/1990 | European Pat. Off. ......... 303/116.1 |
| 0478933 | 4/1992 | European Pat. Off. . |
| 3534240 | 3/1987 | Germany . |
| 4004316 | 2/1991 | Germany . |
| 1-103467 | 7/1989 | Japan . |
| 1384566 | 2/1975 | United Kingdom . |
| 1590003 | 5/1981 | United Kingdom . |
| 2193770 | 2/1988 | United Kingdom . |
| 2219055 | 11/1989 | United Kingdom . |
| 2235507 | 3/1991 | United Kingdom . |

Primary Examiner—Matthew C. Graham
Attorney, Agent, or Firm—W. G. Fasse; W. F. Fasse

[57] ABSTRACT

An antilocking brake fluid pressure control unit for a vehicle includes a fluid pressure control device which receives an antilocking operation signal for controlling the pressure applied to a wheel brake. A pump in a parallel flow circuit returns a brake working fluid. A damping chamber (13) is connected to a fluid passage (9) between an outlet port of the pump and a feedback point (15). A filter is provided in the fluid passage (9) between the damping chamber (13) and the feedback point (15). Due to this structure, air bleeding from a brake piping system is simplified when assembling the brake system in a vehicle, and the time needed for charging a working fluid into the brake system is reduced.

14 Claims, 5 Drawing Sheets

ANTILOCKING BRAKE FLUID PRESSURE CONTROL UNIT FOR VEHICLE BRAKE SYSTEM

This application is a continuation of application Ser. No. 07/967,220, filed on Oct. 27, 1992, now abandoned.

The present invention relates to an antilocking brake fluid pressure control unit for a vehicle brake system, and more particularly, it relates to an antilocking brake fluid pressure control unit which is adapted to return, by suction or pressure, a working fluid discharged from a main fluid passage. A pump is used for returning the working fluid to the main fluid passage.

BACKGROUND INFORMATION

An antilocking brake fluid pressure control unit for a vehicle according to the present invention is located between a master cylinder which is directly coupled with a brake pedal and a piston which is directly coupled with a wheel brake in a braking system for an automobile, for controlling the braking system in an antilocking manner. When a wheel speed detector or a body speed detector detects an excessive slip caused by overbraking or an indication thereof, the antilocking brake fluid pressure control unit drives electromagnetic valves to reduce or control the brake fluid pressure, thereby suppressing or controlling the braking force to an optimum level.

In connection with such an antilocking brake fluid pressure control unit, there has already been developed a rotary flow type unit, which is adapted to feed back a brake working fluid discharged from a wheel cylinder of a wheel brake, by a pump provided on an intermediate portion of a circulation passage for reusing the working fluid. In such a rotary flow type antilocking brake fluid pressure control unit, however, a working noise of the pump, vibration of a piping system caused by pulsation of the working fluid in the circulation passage and a following working noise, or vibration of the pedal inevitably leads to a large noise.

In order to solve such a problem, British Patent No. 1,590,003, for example, discloses a system which comprises a damping chamber provided between an outlet port of a pump and a feedback point for storing a constant volume of a working fluid and an orifice provided in the vicinity of the outlet of this damping chamber for damping any pulsation of the pump through the compressibility of the working fluid.

The antilocking brake fluid pressure control unit according to the aforementioned prior art is applied to a braking system shown in FIG. 4, for example. FIG. 4 shows only an antilocking brake fluid pressure control unit interposed between a master cylinder 2 which is directly coupled with a brake pedal 1 and a wheel cylinder 4 of a wheel brake 3 for performing an antilocking operation. In practice, however, the master cylinder 2 is connected also with other antilocking brake fluid pressure control units which are interposed between the master cylinder and the wheel cylinders of the other three wheels. In the antilocking brake fluid pressure control unit shown in FIG. 4, a two port, two-position electromagnetic valve 6 for controlling the introduction of a working fluid is provided in an intermediate portion of a main fluid passage 5 connecting a master cylinder 2 with a wheel cylinder 4 of a wheel brake 3. The electromagnetic valve 6 is closed only when the magnetic valve coil is energized. The valve 6 is maintained in an open state when the valve coil is deenergized. A circulation passage 7 branches from the main fluid passage 5, so that another two-port, two position electromagnetic valve 8 is provided on an intermediate portion thereof for controlling the discharge of working fluid. This electromagnetic valve 8 is opened only when its coil is energized. The valve 8 is maintained in a closed state when its coil is deenergized. Another circulation passage 9 is provided between a downstream end of the circulation passage 7 and a feedback point 15 in an upstream portion of the main fluid passage 5, while a reservoir 10 is connected to a coupling portion 9 between the circulation passages 7 and 9 for storing the working fluid, which is discharged from the wheel cylinder 4 to flow through the circulation passage 7.

The circulation passage 9 is provided with a pump 12 which is driven by a motor 11, while a damping chamber 13 for storing a constant volume of the working fluid and an orifice 14 are provided downstream of the pump.

The operation of the conventional antilocking brake fluid pressure control unit having the aforementioned structure is now described. When leg power is applied to the brake pedal 1, the master cylinder 2 converts this power to the fluid pressure of the working fluid in response to the amount of actuation. If the unit is in a non-antilocking state, the electromagnetic valves 6 and 8, the coils of which are deenergized, are in open and closed states respectively. When leg power is applied to the brake pedal 1 in this state, the fluid pressure which is converted by the master cylinder 2 in response to the amount of actuation is supplied through the main fluid passage 5 to the wheel cylinder 4 of the wheel brake 3, to drive the wheel brake 3.

When a wheel speed detector or a body speed detector detects an overbraking operation, this unit receives an electric signal to enter an antilocking state, thereby supplying power to both electromagnetic valves 6 and 8.

Therefore, the electromagnetic valves 6 and 8 enter open and closed states respectively to cut off the fluid pressure from the master cylinder 2 and open the circulation 7, thereby attaining a decompressed state in the wheel cylinder 4 of the wheel brake 3. Thus, a brake locking is prevented that could otherwise be caused by an overbraking operation.

In order to re-pressurize the brake fluid pressure, the power supply is stopped to open and close the electromagnetic valves 6 and 8 respectively. In order to maintain the brake fluid pressure at a constant level, further, power is supplied only to the electromagnetic valve 6 for closing the same, while no power is supplied to the electromagnetic valve 8 for maintaining the same in the closed state. Consequently, portions of the main fluid passage 5 and the circulation passage 7 are sealed around the wheel brake 3, to maintain the fluid pressure at a constant level.

The working fluid discharged through the circulation passage 7 and the electromagnetic valve 8 during the antilocking operation is temporarily stored in the reservoir 10. The pump 12 appropriately sucks the working fluid stored in the reservoir 10, and returns the working fluid to the feedback point 15 through the circulation passage 9, thereby reusing the working fluid. At this time, the damping chamber 13 and the orifice 14 provided immediately at the back of the pump 12 absorb a pressure fluctuation which may be caused by pulsation of the pump 12, to relieve any influence on the piping of the circulation passage 9.

However, the rotary flow type antilocking brake fluid pressure control unit of the aforementioned structure has the following problems:

When assembling a vehicle, a brake piping system is temporarily evacuated and then charged with a working fluid under pressure through so-called vacuum charging, so that air is bled from the piping system. If the working fluid remains in the brake piping system, a desired degree of vacuum cannot be attained since the remaining working fluid is vaporized upon exhaust. Also in the antilocking brake fluid pressure control unit shown in FIG. 4, it is necessary to discharge the working fluid after charging the same in the manufacturing step, for performance investigation. In that case, it is difficult to discharge the working fluid from the damping chamber 13, due to provision of the orifice 14. This problem is particularly remarkable when the damping chamber 13 is provided in the vicinity of the orifice 14. In order to completely discharge the working fluid from the damping chamber 13, a fluid discharge port may be provided to be sealed with a tap after discharging the working fluid. In this case, however, costs are increased.

Further, when servicing a vehicle with a brake system as described above, it takes a long time to bleed air only by forcefeed power caused by leg power which is applied to the brake pedal due to an inferior air bleeding ability of the known system. The term "servicing" herein used means that a dealer repairs parts of an automobile requiring such repairs in accordance with a service manual.

In order to solve the aforementioned problems caused in connection with the vacuum charging of the working fluid in the brake piping system, a technique proposed in Japanese Utility Model Laying-Open No. 1-103467 (1989), for example, may be applied to provide a check valve in a portion of the circulation passage 9 between the pump 13 and the feedback point 15 to allow only a flow of the brake fluid from the pump 13 toward the feedback point 15. However, such use of a high-priced check valve also leads to an increase in the costs.

SUMMARY OF THE INVENTION

It is an object of the present invention to simplify the air bleeding of a brake piping system when the brake system is assembled in a vehicle, thereby reducing the time needed for charging a working fluid into the system.

Another object of the present invention is to enable air bleeding of a main fluid passage when the brake system needs to be repaired, by applying power only by operating a brake pedal, while avoiding any significant increase in cost.

In order to attain the aforementioned objects, an antilocking brake fluid pressure control unit according to the present invention is connected to an intermediate portion of a main fluid passage connecting a master cylinder to a wheel brake cylinder. This antilocking brake fluid pressure control unit comprises a fluid pressure control device which receives an antilocking operation signal for discharging a working fluid from the main fluid passage thereby controlling the pressure on the wheel brake, a pump which again returns the discharged working fluid to the main fluid passage, a circulation passage connecting a branch conduit to a feedback point in the main fluid passage, whereby the feedback point is located in the vicinity of an upstream end of the main fluid passage near the master cylinder, and a damping chamber connected to an intermediate portion of the circulation passage for storing a constant volume of the working fluid. Further, a flow restricting orifice with a filter is provided in a portion of the circulation passage between the damping chamber and feedback point;

According to the aforementioned structure, the filter is provided in a portion of the circulation passage between the damping chamber and the feedback point. Even if the damping chamber which is closer to the pump as compared with the filter, is charged with the working fluid, a mesh forming the filter is wetted with the working fluid to cause surface tension on the working fluid if the working fluid is discharged from only a portion on the feedback point side of the filter. Therefore, if the piping system is evacuated the surface tension overcomes the vacuum suction force that the working fluid stored in the damping chamber is not sucked beyond the filter. Consequently, a desired degree of vacuum can be easily attained.

Further, when repairs are needed it is possible to easily bleed air from the main fluid passage only by force-feed power caused by operating the brake pedal, since the damping chamber remains filled up with the working fluid.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS AND OF THE BEST MODE OF THE PRESENT INVENTION

Figure 1:
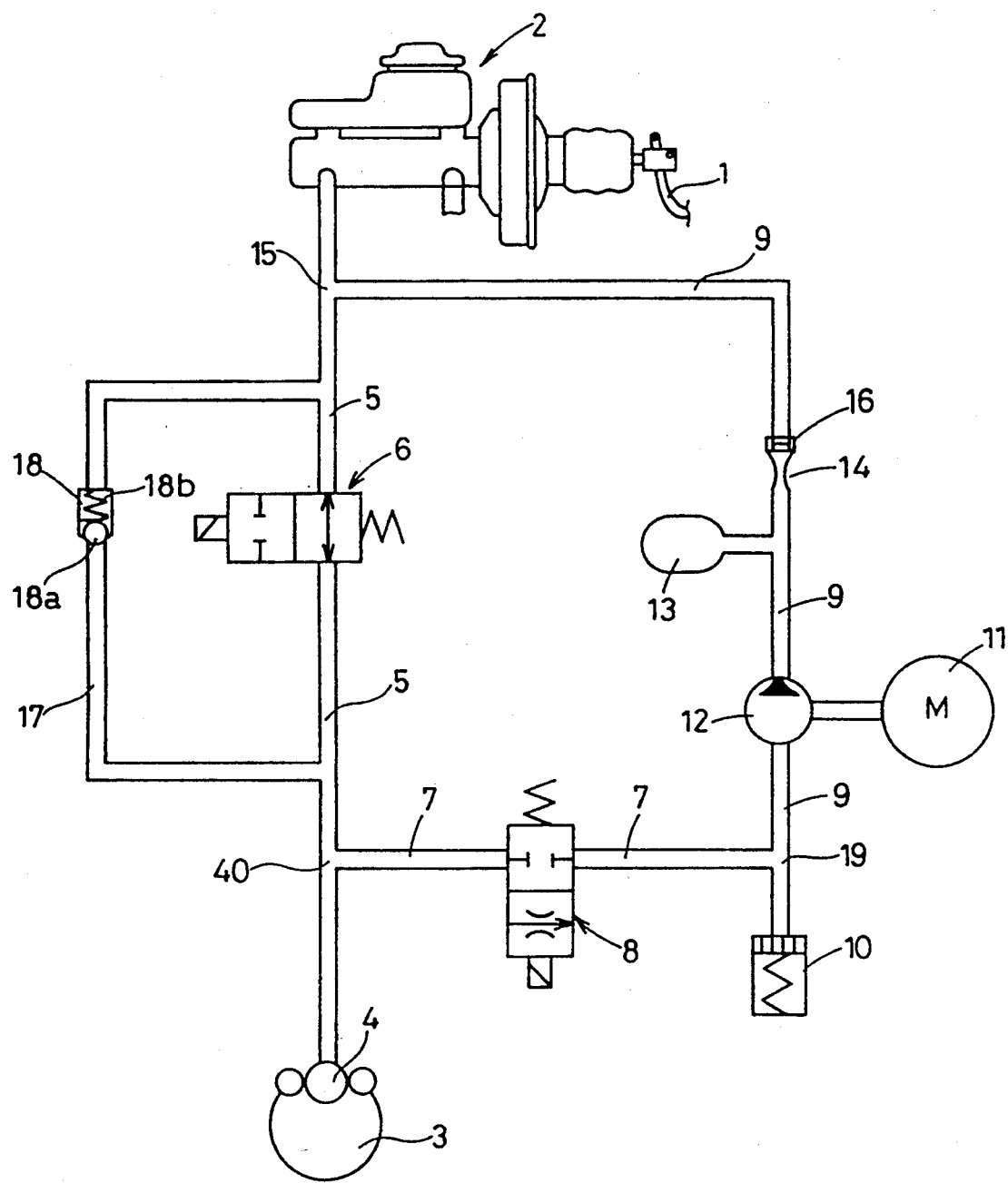
FIG. 1 illustrates the structure of an antilocking brake fluid pressure control unit according to a first embodiment of the present invention.

Referring to FIG. 1, an antilocking brake fluid pressure control unit according to the first embodiment is interposed between a master cylinder 2 which is directly coupled with a brake pedal 1 and a wheel cylinder 4 of a wheel brake 3. In practice, the master cylinder 2 is also connected with other antilocking brake fluid pressure control units (not shown) which are interposed between the master cylinder and the other three wheel brakes (not shown). In the antilocking brake fluid pressure control unit according to this embodiment, a two-port, two-position electromagnetic valve 6 for controlling the introduction of a working fluid is connected in an intermediate portion of a main fluid line or passage 5 connecting the master cylinder 2 with the wheel cylinder 4 of the wheel brake 3. This electromagnetic valve 6 is closed only when its coil is energized and the valve 6 is maintained in an open state when the coil is deenergized. A by-pass circulation passage 7 branches from the main fluid passage 5 and another two-port, two-position electromagnetic valve 8 is connected in the circulation passage for controlling the discharge of working fluid. This electromagnetic valve 8 is opened only when its coil is energized and the valve 8 is maintained in a closed state when the coil of the valve 8 is deenergized. Another circulation passage 9 forming part of the by-pass is provided between a downstream end of the circulation passage 7 and an upstream portion of the main fluid passage 5. A reservoir 10 is connected to a coupling junction 19 between the circulation passages 7 and 9. The reservoir stores the working fluid, which is discharged from the wheel cylinder 4 to flow through the circulation passages 7.

A pump 12 is connected in the circulation passage 9 and driven by a motor 11. A damping chamber 13 for storing a constant volume of the working fluid and a flow restricting orifice 14 are respectively connected to and in the passage 9 downstream of the pump 12.

Figure 4:
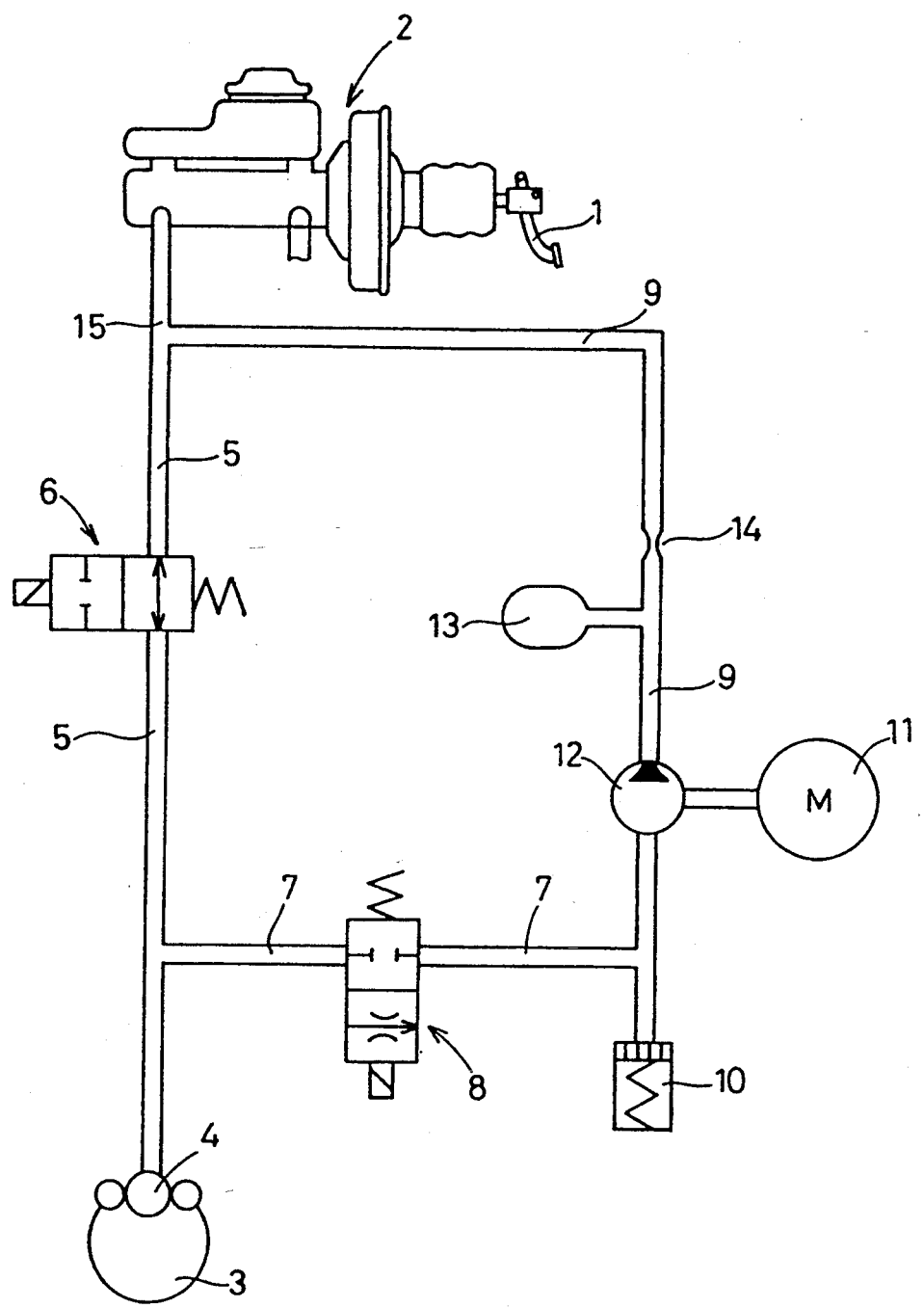
FIG. 4 illustrates the structure of a conventional rotary flow type antilocking brake fluid pressure control unit.
Figure 5A:
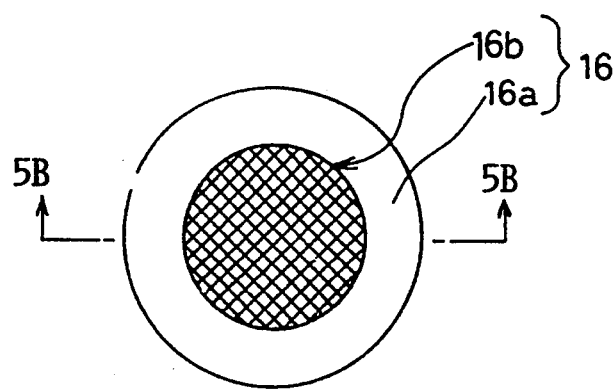
FIG. 5A is a plan view showing a filter provided between a damping chamber and a feedback point.
Figure 5B:
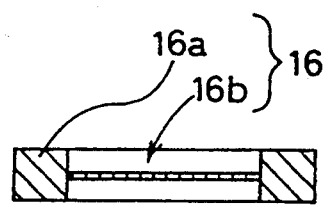
FIG. 5B is a sectional view taken along the line 5B—5B in FIG. 5A.

The aforementioned structure is similar to that of the conventional antilocking device shown in FIG. 4. However, the present embodiment is different from the above prior art in that a filter 16 is provided immediately on a downstream side of the flow restricting orifice 14. As shown in FIGS. 5A and 5B, this filter 16 is provided with a cylindrical frame 16a having a through hole and a circular sheet type screen mesh 16b which is mounted on the frame 16a. The mesh size of the screen mesh 16b has openings each of which is 20 by 20 $\mu$m to 30 $\mu$m by 30 $\mu$m, preferably about 25 by 25 $\mu$m in mesh size.

The function of this filter 16 is as follows: When the working fluid is bled from the main fluid passage 5 and from the circulation passage 7, the working fluid adheres to the mesh 16b, whereby the fluid is bled only from the portion of the passage 9 between the feedback point 15 and the screen mesh 16b, while the portion of the passage 9 that is connected to the damping chamber 13 upstream of the screen mesh 16b remains filled up with the working fluid. The working fluid adheres to each opening of the screen mesh 16b of the filter 16 by its surface tension. Thus, if evacuation is performed for vacuum-charging the working fluid when assembling the brake system of a vehicle, the surface tension of the working fluid overcomes the vacuum suction force, whereby the brake working fluid stops flowing out from the damping chamber 13 toward the feedback point 15. Thus, disadvantages such as boiling of the working fluid in the circulation passage 9 and residual air in the working fluid are prevented.

Further, a bypass passage 17 is provided in parallel with the main fluid passage 5, and a check valve 18 is connected in this bypass passage 17. The check valve 18 comprises a spherical valve member 18a which is urged against a valve seat by a spring 18b with a prescribed force in a forward direction from the feedback point 15 toward the wheel brake 3.

The operation of the antilocking brake fluid pressure control unit according to the first embodiment having the aforementioned structure is now described. When a force is applied to the brake pedal 1, the master cylinder 2 converts this force to the fluid pressure of the working fluid in response to the amount of actuation. In a nonantilocking operation of this unit, the electromagnetic valves 6 and 8 are not energized and hence are in open and closed states, respectively as shown in FIG. 1. When a force is applied to the brake pedal 1 in this state, the fluid pressure which is converted by the master cylinder 2 in response to the amount of actuation is supplied through the main fluid passage 5 to the wheel cylinder 4 of the wheel brake 3, thereby driving the wheel brake 3.

When a wheel speed detector or a body speed detector detects an overbraking operation, this unit receives an electric signal to enter an antilocking state, thereby supplying power to the electromagnetic valves 6 and 8, whereby the electromagnetic valves 6 and 8 enter closed and open states respectively to cut off the fluid pressure from the master cylinder 2 and open the circulation passage 7 for discharge, thereby attaining a decompressed state in the wheel cylinder 4 of the wheel brake 3. Thus, the unit prevents the occurrence of a locking state caused by an overbraking operation.

When a pressure stronger than the urging force of the spring 18b in the check valve 18 is applied to the main fluid passage 5 before operations of the electromagnetic valves 6 and 8, the check valve 18 is opened so that the working fluid flows back to the upstream side through the bypass passage 17, thereby preventing the unit from a locking state.

In order to thereafter increase the brake fluid pressure again, the valves 6 and 8 are deenergized to again bring the electromagnetic valves 6 and 8 into open and closed states respectively. However, in order to maintain the working fluid pressure at a constant level, further, power is supplied only to the electromagnetic valve 6 to bring the same into a closed state, while not applying any power to the electromagnetic valve 8 to maintain the same in an open state. As the result, portions of the main fluid passage 5 and the circulation passage 7 are so sealed that the working fluid contained therein is maintained at a constant pressure.

In the antilocking state, the working fluid discharged through the circulation passage 7 and through the electromagnetic valve 8 is temporarily stored in the reservoir 10. The working fluid thus stored in the reservoir 10 is appropriately pumped by the pump 12 and returned to the feedback point 15 through the circulation passage 9, to be reused as brake fluid. At this time, any pressure fluctuation caused by pulsation of the pump 12 is absorbed by the damping chamber 13 and the orifice 14 which are provided immediately at the back of the pump 12, whereby any vibration influence on the piping of the circulation passage 9 is relieved.

According to this embodiment, portions of the circulation passages 7 and 9 between the electromagnetic valve 8 and the filter 16 as well as the damping chamber 13 are filled up with the working fluid when the brake device is delivered for assembly in a vehicle. In order to vacuum-charge the working fluid in the assembling step air may be bled simply from the main fluid passage 5 and portions of the circulation passages 7 and 9 other than those between the electromagnetic valve 8 and the filter 16. The damping chamber 13, which has been particularly problematic in the conventional vacuum charging, is already filled up with the working fluid, and hence no problem is caused by vaporization of the working fluid in the damping chamber 13 etc.

According to this embodiment, as herein above described, the portions between the electromagnetic valve 8 and the filter 17 are filled up with the working fluid, whereby a desired vacuum state can be easily attained for vacuum-charging the working fluid into the unit during assembly in a vehicle, while it is possible to bleed air only through by operating the brake pedal 1 for service or repair of the unit.

Figure 2:
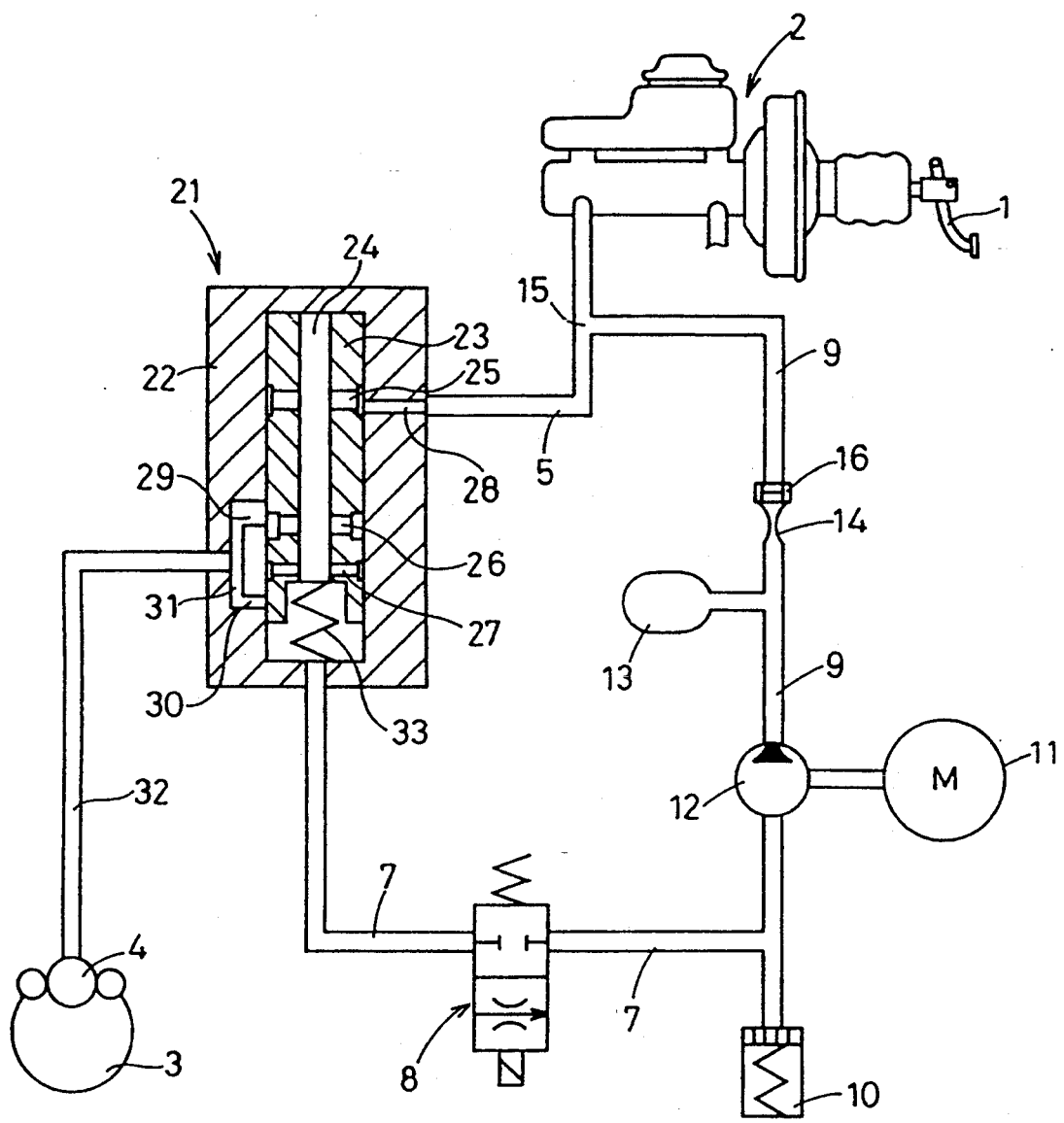
FIG. 2 illustrates the structure of an antilocking brake fluid pressure control unit according to a second embodiment of the present invention.
Figure 3A:
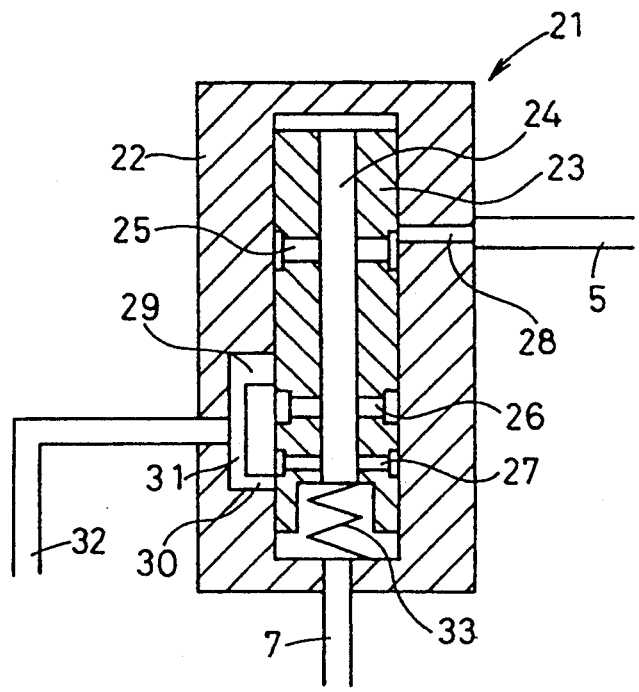
FIGS. 3A and 3B are sectional views successively showing the positional relationship between a cylinder block and a spool of a control valve according to the second embodiment of the present invention in an antilocking state.
Figure 3B:
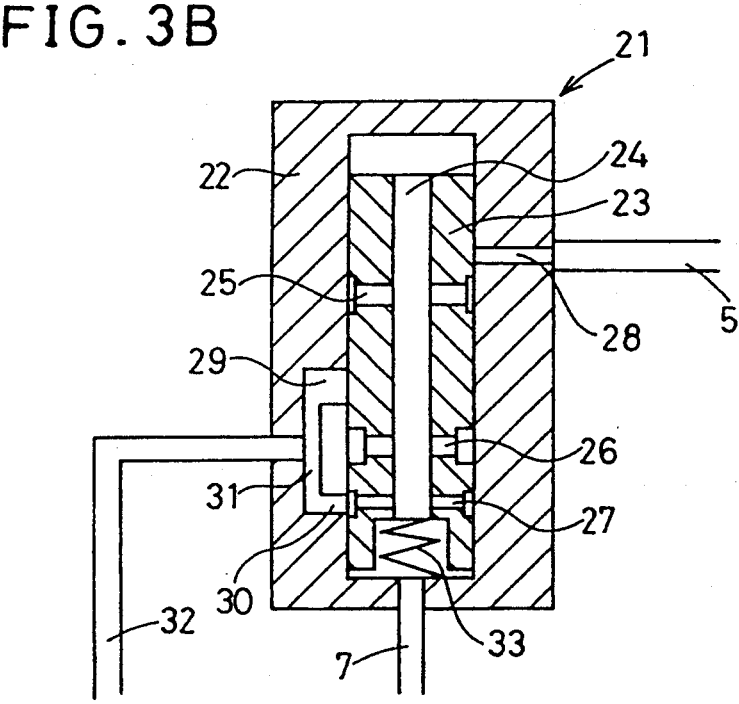

The second embodiment shown in FIGS. 2, 3A, and 3B is identical to the first embodiment in the structure of a portion between a downstream side of an electromagnetic valve 8 and a feedback point 15. This embodiment is different from the first embodiment in that a control valve 21 without any electromagnetic operation, is employed in place of the electromagnetic valve 6 on a working fluid inlet control side. This control valve 21 comprises a hollow cylinder block 22 and a spool 23 slidably arranged therein. The spool 23 has a first fluid passage 24 passing through the same along its central axis, and second, third and fourth fluid passages 25, 26 and 27 communicating with the first fluid passage 24 radially along the spool 23. The cylinder block 22 is provided with an inlet passage 28, which is directly coupled with a main fluid passage 5, along its radial direction. The cylinder block 22 is further provided along its radial direction with first and second outlet passages 29 and 30, which are coupled with each other by an outlet 31. This outlet 31 is directly coupled to a passage 32, which is connected to a wheel cylinder 4 of a wheel brake 3.

The operation of the antilocking brake fluid pressure control unit according to this embodiment is now described. In a non-antilocking state of this embodiment, the spool 23 is the position shown in FIG. 2 relative to the cylinder block 22. In other words, the spool 23 is pressed by a spring 33 against the upper end of the cylinder block 22, while the electromagnetic valve 8 is maintained deenergized whereby the valve 8 is in a closed state. When a force is applied to the brake pedal 1 in this state, the master cylinder 2 converts the pedal operation to a fluid pressure, whereby the working fluid passes through the main fluid passage 5, the inlet passage 28 and the second fluid passage 25, to enter the first fluid passage 24. Thereafter the working fluid flows through the third fluid passage 27, the first outlet passage 29, the outlet 31, and the passage 32 to reach the wheel cylinder 4, thereby driving the wheel brake 3.

When a wheel speed detector (not shown) or the like detects an excessive slip or an indication thereof and the unit enters an antilocking state, the electromagnetic valve 8 is first energized to enter the open state. As a result, the working fluid can now flow out from the wheel cylinder 4 through the electromagnetic valve 8, whereby a pressure difference is caused between the upper and lower end surfaces of the spool 23. Due to an urging force based on this pressure difference, the spool 23 is moved downwardly against the urging force of the spring 33, to attain the positional relationship shown in FIG. 3A. In this state, communication between the third fluid passage 26 and the first outlet passage 29 is cut off while the fourth fluid passage 27 is also cut off from communication with the second outlet passage 30, whereby supply of the working fluid to the wheel brake 3 is stopped.

When the working fluid further flows out from the electromagnetic valve 8 and the spool 23 reaches the downward position shown in FIG. 3B, the fourth fluid passage 27 communicates with the second outlet passage 30. When the electromagnetic valve 8 enters into the closed state when its coil is deenergized, the working fluid in the wheel cylinder 4 is sealed and maintained at a constant pressure. When the brake pedal 1 is released, the pressure difference between the upper and lower ends of the spool 23 is inverted to move the spool 23 upwardly, whereby the spool 23 is returned to the state shown in FIG. 2.

According to each of the embodiments, as hereinabove described, the filter is so provided between the damping chamber 13 and the feedback point 15 that the unit can be easily evacuated in a step of vacuum-charging a working fluid in the brake piping system while assembling the system in a vehicle without using high-priced mechanical parts, whereby the vacuum charging step is improved in its workability and the time therefore is reduced.

Also, when service is needed, air can be easily bled merely by operating the brake pedal, whereby maintenance work can be easily performed.

Although the present invention has been described and illustrated in detail, it is clearly understood that the same is by way of illustration and example only and is not to be taken by way of limitation, the spirit and scope of the present invention being limited only by the terms of the appended claims.

It is claimed:

1. An antilocking brake fluid pressure control unit for a vehicle brake system including a main fluid passage connecting a master cylinder to a wheel cylinder of a wheel brake, said master cylinder being coupled with a brake pedal, said antilocking brake fluid pressure control unit comprising: fluid pressure control means for receiving an antilocking operation signal and for discharging a working fluid from said main fluid passage in response to said antilocking operation signal, thereby controlling the fluid pressure on said wheel brake; a working fluid return circulation passage (7, 9) having one end coupled to a feedback point (15) positioned in said main fluid passage closer to said master cylinder (2) and a second end coupled to a branching point (40) in said main fluid passage (5) near said wheel cylinder (4), said return circulation passage including a branch portion (7) connected to said branching point and a feedback portion (9) connected to said feedback point; a pump (12) in said feedback portion (9) for returning working fluid to said feedback point (15), a damping chamber (13) connected to said feedback portion (9) between said pump (12) and said feedback point (15) for storing a constant volume of said working fluid; a flow restricting orifice (14) in said feedback portion (9) between said pump (12) and said feedback point (15), and a filter (16) positioned in said feedback portion (9) between said damping chamber (13) and said feedback point (15), said filter (16) having a sufficiently small mesh size so that working fluid adheres by surface tension to said filter (16) sufficiently to stop working fluid from flowing out of said damping chamber (13) to said feedback point (15) when working fluid is bled from said main fluid passage (5).

2. The unit of claim 1, wherein said filter (16) comprises a screen frame having a through hole and a screen mesh mounted to cover said through hole in said screen frame.

3. The unit of claim 2, wherein said screen mesh has mesh openings having mesh sizes within the range of 20 $\mu$m by 20 $\mu$m to 30 $\mu$m by 30 $\mu$m.

4. The unit of claim 1, wherein said fluid pressure control means include a first electromagnetic valve (6) connected in said main fluid passage (5) between said feedback point (15) and said branching point (40), and a second electromagnetic valve (8) connected in said branch portion (7) of said circulation passage upstream of said pump.

5. The unit of claim 4, wherein said first electromagnetic valve (6) is closed when energized and open when deenergized, and wherein said second electromagnetic valve (8) is open when energized and closed when deenergized.

6. The unit of claim 4, further comprising a bypass passage (17) connected to said main fluid passage (5) in parallel to said first electromagnetic valve (6), said bypass passage (17) comprising a check valve (18) for returning working fluid from a downstream side toward an upstream side of said first electomagnetic valve (6) only when a brake fluid pressure exceeds a prescribed value.

7. The unit of claim 1, further comprising a working fluid reservoir (10) connected to said circulation passage between said fluid pressure control means (8) and said pump (12), said reservoir (10) storing working fluid flowing out of said main fluid passage (5) through said branch portion (7).

8. The unit of claim 1, wherein said fluid pressure control means comprises a control valve (21) connected in said main fluid passage and to said branch portion (7), said control valve (21) being driven by differential pressure of said working fluid, and an electromagnetic valve (8) connected in said branch portion (7) of said circulation passage between said control valve (21) and said pump (12).

9. The unit of claim 8, wherein said control valve (21) is adapted to cut off communication through said main fluid passage only when a braking pressure exceeds a threshold value, and wherein said electromagnetic valve is energized to open only when said braking pressure exceeds said threshold value.

10. The unit of claim 1, wherein said damping chamber (13) is connected to said feedback portion (9) between said pump (12) and said flow restricting orifice (14).

11. The unit of claim 1, wherein said filter (16) comprises a screen frame having a through hole and a screen mesh mounted to cover said through hole in said screen frame, and wherein said fluid pressure control means include a first electromagnetic valve (6) connected in said main fluid passage (5) between said feedback point (15) and said branching point (40), and a second electromagnetic valve (8) connected in said branch portion (7) of said circulation passage upstream of said pump.

12. The unit of claim 1, wherein said filter (16) comprises a screen frame having a through hole and a screen mesh mounted to cover said through hole in said screen frame, and wherein said fluid pressure control means comprises a control valve (21) connected in said main fluid passage and to said branch portion (7), said control valve (21) being driven by differential pressure of said working fluid, and an electromagnetic valve (8) connected in said branch portion (7) of said circulation passage between said control valve (21) and said pump (12).

13. The unit of claim 1, further comprising a working fluid reservoir (10) connected to said circulation passage between said fluid pressure control means (8) and said pump (12), said reservoir (10) storing working fluid flowing out of said main fluid passage (5) through said branch portion (7), and wherein said damping chamber (13) is connected to said feedback portion (9) between said pump (12) and said flow restricting orifice (14).

14. The unit of claim 1, wherein said filter (16) is provided adjacent said flow restricting orifice (14) on a side toward said feedback point (15).

* * * * *